United States Patent [19]
DeYesso et al.

[11] Patent Number: 5,371,743
[45] Date of Patent: Dec. 6, 1994

[54] ON-LINE MODULE REPLACEMENT IN A MULTIPLE MODULE DATA PROCESSING SYSTEM

[75] Inventors: Joseph P. DeYesso, Walpole, Mass.; Robert C. Solomon, Kensington, N.H.; Stephen J. Todd, Shrewsbury, Mass.; Mark C. Lippitt, Boulder, Colo.

[73] Assignee: Data General Corporation, Westboro, Mass.

[21] Appl. No.: 847,638

[22] Filed: Mar. 6, 1992

[51] Int. Cl.5 .............................. G06F 11/00
[52] U.S. Cl. .................... 371/8.1; 371/10.1; 371/9.1
[58] Field of Search .......... 371/8.1, 10.1, 68.1, 371/7, 9.1; 395/575

[56] References Cited

U.S. PATENT DOCUMENTS 4,761,785  8/1988  Clark et al. ..................... 371/51
5,081,626  1/1992  Scott ............................ 371/22.4

FOREIGN PATENT DOCUMENTS 0352934  1/1990  European Pat. Off. .
0369707  5/1990  European Pat. Off. .

OTHER PUBLICATIONS

Patterson et al., "A case for Redundant Arrays of Inexpensive Disks" (RAID) University of California, Berkely, Calif., undated, pp. 1-24.
NCR Disk Array Controller-Application Notes, No. 5, Dec. 16, 1991, pp. 1-2.
J. L. McCleklan, "Multiple Small Disk Memory Subsystem" Mar., 1991 (one page).

Primary Examiner—Robert W. Beausoliel, Jr.
Assistant Examiner—Ly V. Hua
Attorney, Agent, or Firm—Robert F. O'Connell

[57] ABSTRACT

A method for providing on-line replacement of a module which is at a specified position in an array of modules connected to a common control processor so that all other modules in the array can continue operating during the replacement operation. When the module is removed an indication is provided to the control processor showing that removal has occurred and identifying the position thereof. When the replacement has occurred an indication thereof is provided to the control processor, the replacement module is tested, and the state of the replacement module is updated to place it in the same state it would have been in if it had not been replaced.

5 Claims, 5 Drawing Sheets

ON-LINE MODULE REPLACEMENT IN A MULTIPLE MODULE DATA PROCESSING SYSTEM

INTRODUCTION

This invention relates generally to techniques for replacing one or more modules in an array of multiple modules used in a data processing system and, more particularly, to the on-line replacement of one or more modules of the array, that is, replacement occurs when all of the modules are in an operating state, so that all modules not being replaced remain in their operating states to permit the system to continue its overall operation while the removal and replacement of a particular module or modules is occurring.

BACKGROUND OF THE INVENTION

In data processing systems which use multiple modules, e.g., an array of peripheral drive modules, or units, such as data storage disks, it is sometimes necessary to replace one or more defectively operating drive modules. Normally, in order to do so, the operation of the entire array is suspended while the one or more defective modules are removed and one or more new modules are substituted. In effect, the system operation must be halted and no further data processing operations can occur with respect to the module array until the one or more new replacement modules are inserted and the states of each of the replacement modules are updated to conform to the state of the modules that have been replaced.

It is desirable to devise a technique wherein one or more defective modules of an array thereof can be removed and one or more new modules substituted therefor without shutting down the operation of the entire array so that all of the other modules remain in operation for whatever data processing operations are occurring. Such a technique should include the provision of an appropriate indication to the control processor which controls the operation of the modules that a removal operation is occurring. The technique should then permit a new module to be inserted into the array and then provide for an appropriate indication thereof to the control processor and for an operation by which the state of the new module can be updated to be the same as the state of the prior used module would have been if it had not needed replacement. Accordingly, the new module is then fully operative from that point on. Such an overall process can be referred to as a "hot repair" technique.

BRIEF SUMMARY OF THE INVENTION

In accordance with the invention, when a drive module of an array of multiple modules becomes defective, for whatever reason, and the module must be replaced, the module is removed from the slot to which it is interconnected into the system, which interconnection slot normally places the module in communication with a control processor which controls data transfers to and from the array and in communication with other modules of the array. The configurations of the connecting elements at the backplane connectors of a module slot and the connector pins, or fingers, at the module plug itself which connect to the backplanes connectors are arranged so that, as a defective module is being removed, the state of a global monitor signal, which is connected to all modules of that portion of an overall array with which the defective module is associated, is changed and such change is communicated to the control processor to indicate that a module of such group thereof is being physically acted upon, e.g., it is being physically removed from, or inserted into, its backplane slot position. During a removal operation, just prior to such change in state of the global monitor signal, a recessed pin, or finger, of the edge connector of the module plug breaks its connection to a common voltage bus to which all of the associated modules are connected. Such common bus may distribute a non-regulated or semi-regulated voltage signal which is used by the power control portion of the module to supply the desired regulated voltages needed to activate the drive circuit portion of the module. The regulated voltages are thus isolated from the transients that occur on the distributed voltage bus by the local regulators contained in each module.

Each module of an associated group thereof responds to the change in state of the global monitor signal, so as to generate a reset signal at each of the non-removed modules. The reset signals have a sufficient duration to last at least as long as it takes to effect the physical removal of the defective module. The reset signals are supplied to the control processor for use in identifying where in the array the removal has occurred. The control processor responds to the generation of such reset signals, which informs the control processor that a removal event has taken place, by repeating any current data transfer operation to assure that a correct data transfer has been made and by polling all of the modules of the associated group thereof to determine at which module slot the physical change occurred, i.e., to identify which module in the group has been removed.

During insertion of a new module, the global monitor signal again changes its state for a selected time duration (as it did during a module removal operation) to indicate that insertion of the new module is occurring. The changed state of the global monitor signal is also communicated to all associated modules and again causes each module to generate a reset signal, as above. The control processor then polls the group to identify where the new module has been inserted. By the time the global monitor signal returns to its previous state, the new module is re-connected in its backplane slot via the recessed pin of its edge connector. The control processor then updates the state of the inserted module to place it in the same state that the prior used module would have been in if it had not been removed and replaced.

In this manner, a module of an array can be replaced without requiring a suspension of the operation of the remaining modules of the array (a "hot" repair operation) and the overall array, once a module has been replaced, can then continue its operation as if no replacement had occurred.

DESCRIPTION OF THE INVENTION

The invention can be described in more detail with the help of the accompanying drawings wherein FIG. 1 shows a block diagram of an exemplary array of modules for driving an array of disks in accordance with the invention;

DESCRIPTION OF THE PREFERRED EMBODIMENT

The hot repair operation of the invention can be described, for example, more specifically in the context of an array of peripheral disk storage modules, each of which comprises a data storage disk and drive circuitry therefor and power/control circuitry for supplying the necessary regulated voltages for operation of the disk drive circuitry. Such an array is shown diagrammatically in FIG. 1, which depicts an array 10 comprising disk modules 11, the particular example depicted having a total of thirty modules which can be identified as modules 0-29, for convenience not all of which are specifically shown in the particular array depicted. Each module includes a data storage disk and drive unit 11A (which would be well-known to those in the art and need not be described in detail), and a power/control circuit unit 11B for supplying appropriately regulated voltages to the drive circuitry. In a typical power/control unit 11B as shown in FIG. 2, for example, a common supply voltage, e.g., 60 volts, which may be unregulated or regulated at least to some degree, is supplied to power regulator and monitor circuitry 27 which in turn supplies the more highly regulated voltages, e.g., 5 volts and 12 volts, required for the drive circuits. Such voltage regulator/monitor circuitry is of any suitable type which would be well-known to those in the art and need not be discussed in more detail.

Figure 1:
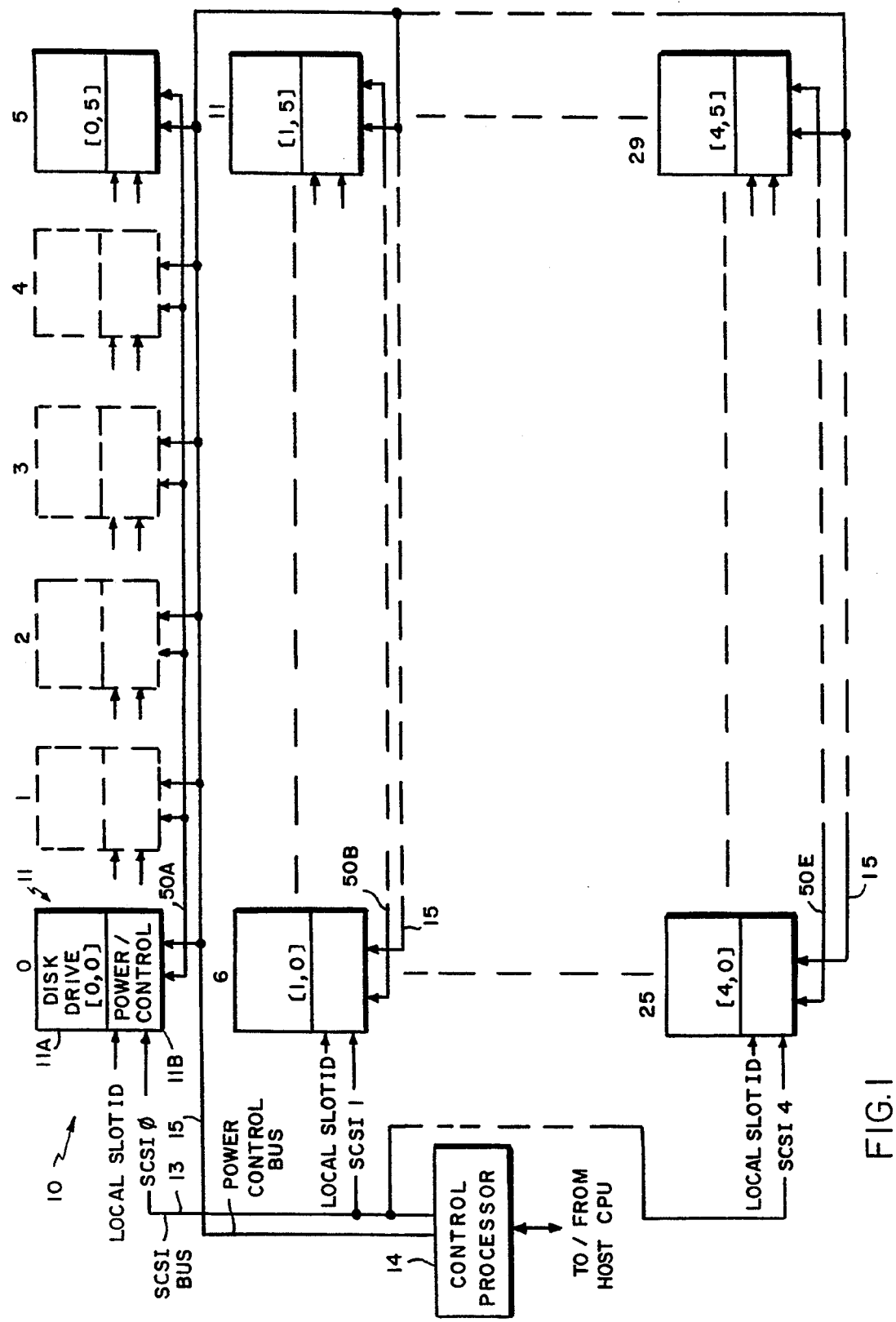
Figure 2:
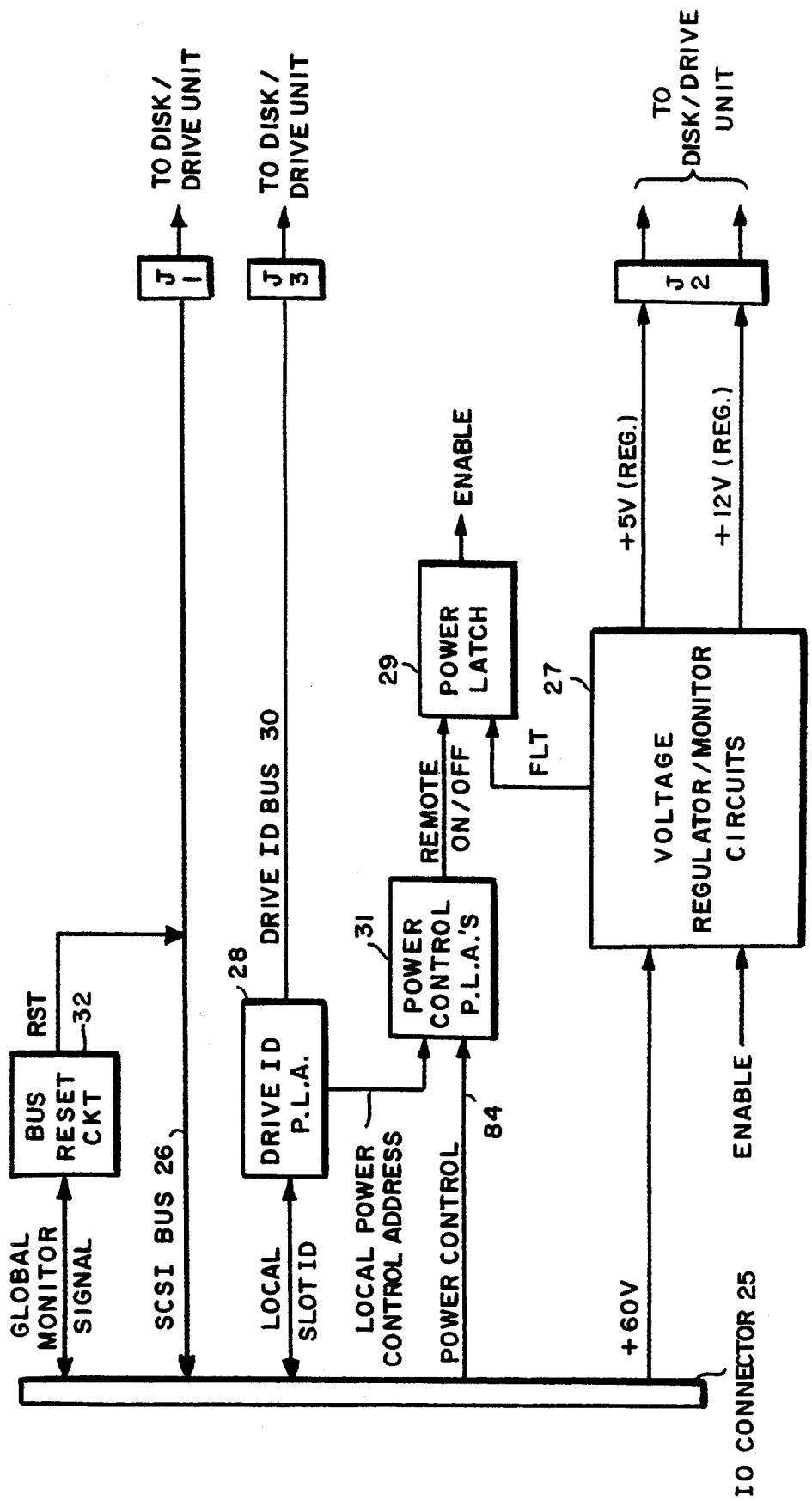
FIG. 2 shows a block diagram of a typical exemplary power control unit used in a module of the array of FIG. 1.

In the exemplary array of FIG. 1, data is transferred to disk modules 11 via a plurality of buses 13, which in the particular embodiment shown are well-known Small Computer System Interface buses, usually referred to as SCSI buses. In the array depicted, five SCSI buses 0-4 are used, each one being commonly used with a group of six modules and being ported from an I/O control processor 14 at corresponding SCSI ports thereat. Thus, a SCSI port is connected to SCSI bus 0 which is in turn connected to each of the six modules 0-5, another port is connected to SCSI bus 1 which is in turn connected to each of modules 6-11, and so forth as shown. Each port and the modules associated with it are identified as shown by the bracketed numbers in each module block in the figure. Thus, [0,0] identifies port 0 and module 0; [0,1] identifies port 0 and module 1, and so forth as shown in FIG. 1.

While a single backplane assembly can be used for connections to the array, for convenience, the array may be divided, for example, into two separate backplane assemblies for incremental array expansion. Each power/control unit 11B of a module 11 is connected to an I/O control processor 14 (FIG. 1) via a common power control bus 15 via an I/O connector 25 as shown in FIG. 2 which depicts a block diagram of a typical power control unit 11B of a typical module 11. For convenience, power control bus 15 is shown connected only to modules 0-6 in FIG. 1, it being understood that similar connections exist to the remaining modules 7-29. As seen in FIG. 2, a SCSI bus signal is supplied via a suitable set of pins on connector 25 to an internal SCSI bus 26 which is connected to the associated disk/drive unit 11A of the module via a connector J1. A +60 v. unregulated or semi-regulated voltage, for example, is connected to voltage regulator and monitor circuitry 27, which converts the semi-regulated 60 v. signal to more highly regulated +5 v. and 12 v. signals, as would be well-known to those in the art, for supply to disk drive circuit 11A of the module via connector J2. Should the regulated output voltages be unavailable due to a malfunction or failure of the regulator circuits, suitable monitor circuitry produces a voltage fault signal (FLT), as would also be well-known to those in the art.

A module identification signal (SLOT ID) unique to each module position in the array is supplied to a suitable drive identification program logic array (PLA) 28 which produces a DRIVE ID signal for supply to a DRIVE ID bus 30 and thence to the disk/drive unit 11A via connector J3. The PLA 28 also supplies a local power control address at a power control signal bus to power control logic arrays (PLA's) 31, as shown. The voltage regulator/monitor circuits are enabled via an ENABLE signal supplied from a latch circuit 29, so long as a REMOTE ON/OFF signal supplied from PLA's 31 is in its ON state and there is no FLT signal present. The REMOTE ON/OFF signal is supplied via power control program logic arrays 31, which compare the power control address on the power control bus 34 from the control processor with the local power control address and decode the remote on/off commands issued over the power control BUS. The power control bus 34 is distributed to all modules in the array.

Figure 3:
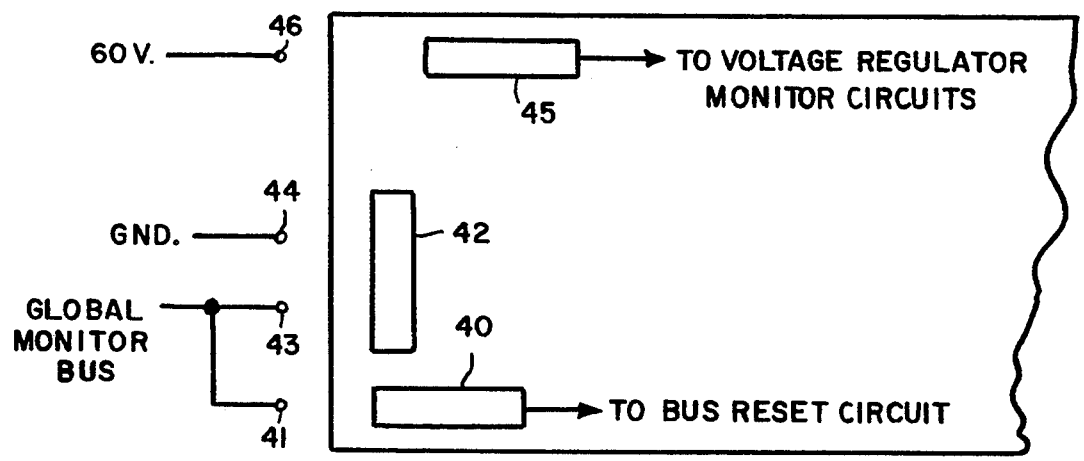
FIG. 3 shows in diagrammatic form pertinent pin connections used at one stage of operation for connecting certain signals used with respect to a typical power control unit of FIG. 2.

A Global Monitor Signal is interconnected between all power/control units associated with a particular SCSI bus (e.g., Global Monitor Signals 50A-50E as shown in FIG. 1) via backplane I/O connector 25. In order to effect a hot repair operation, i.e., a removal of a defective, or failed, module and an insertion of a new module, at the required module slot via the backplane connector, selected fingers and pins thereof are arranged as shown in FIGS. 3, 4A, and 4B.

A finger 40 on the module side of connector 25 is connected to a bus reset circuit 32 (FIG. 2) of the power/control unit 11B and carries the Global Monitor Signal when it is connected to wiper pin 41 on the control processor side of connector 25, which pin is in turn connected to a Global Monitor Signal connected to all modules which are on the same SCSI BUS. (50A-50E in FIG. 1). A shorting finger 42 is arranged, when inserted into connector 25, to short circuit wiper pins 43 and 44 to each other, one of which (pin 43) is connected to the global monitor bus and to wiper pin 41 and the other of which (pin 44) is connected to ground potential. A finger 45 is mounted in a recessed position relative to fingers 40 and 42 so that its front edge is just behind the trailing edge of shorting finger 42. Recessed finger 45, when fully inserted, is connected to wiper pin 46 of connector 25 and carries the 60 v. signal for supply to the voltage regulator/monitor circuitry of power/control unit 11B. This allows the distributed power/reset signals to "break before make" on removal and "make after make" on insertion, as would be recognized by those skilled in the art.

Figure 4A:
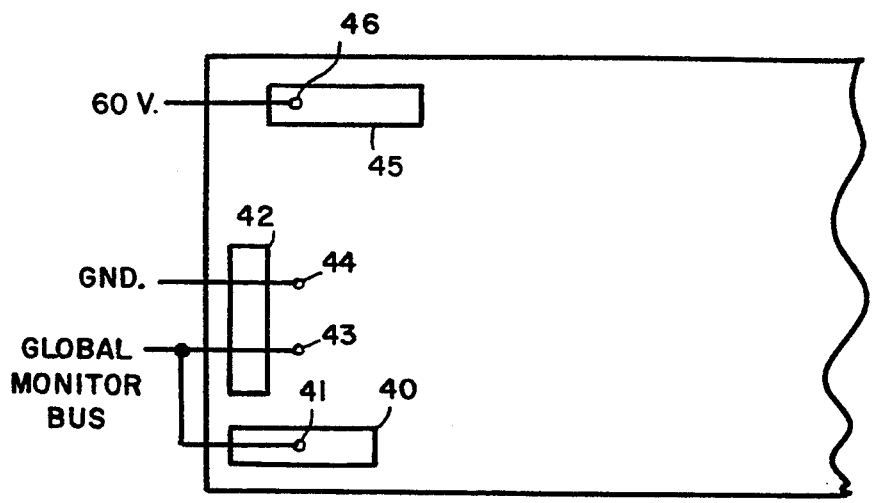
FIGS. 4A and 4B show in diagrammatic form the connections of FIG. 3 at two other stages of operation useful in explaining the operation of the invention.
Figure 4B:
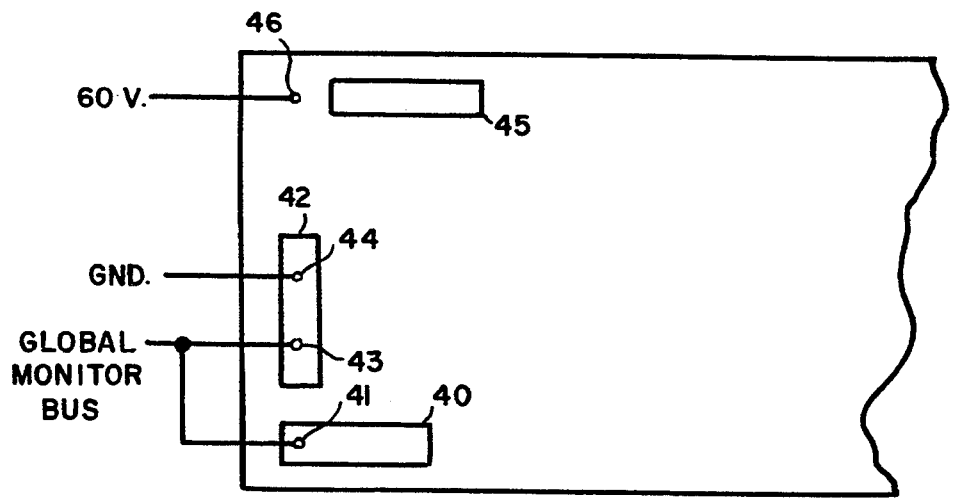

Just prior to the time a defective module unit is removed from its slot during a hot repair operation, the fingers and wiper pins thereat are in the positions shown in FIG. 4A, wherein the edge connector of the module is fully inserted into connector 24, so that finger 45 supplies the 60 v. signal to the voltage regulator/monitor circuitry 27. As seen in FIG. 4B, as the module is removed, finger 45 is first disconnected from the 60 v. supply and shorting finger 42 substantially immediately thereafter shorts the Global Monitor Signal to ground. The Global Monitor Signal at all of the modules in the group associated with the module being removed is thereby shorted to ground so that such signal changes its state from a "high" to a "low" state value. Such change in state causes bus reset circuit 32, which responds thereto, to produce a RST signal on SCSI bus 26 for supply to the control processor indicating that a physical event, i.e., a removal or an insertion event, is occurring.

The control processor responds thereto so as to poll all of the modules of the group associated with the particular SCSI bus to determine how the module configuration of that group has changed, in accordance with a monitor polling program as set forth in the flow chart of FIG. 5, discussed in more detail below. Further removal of the module then places the fingers 40, 42 and 45 in the fully disconnected positions shown in FIG. 3 and the Global Monitor Signal, which is no longer shorted to ground, returns to its high state. All of the other modules, which use the same SCSI bus and are associated with the removed module, remain operative in their fully inserted positions (FIG. 4A).

When a new module is inserted, the shorting finger 42 thereof initially short circuits the Global Monitor Signal to ground before recessed finger 45 is connected to the 60 v. supply (FIG. 4B). The Global Monitor Signal by changing its state from high to low causes the bus reset circuits of each of the other modules to generate a RST signal on the SCSI bus which informs the control processor that an insertion event is occurring. The control processor controls the operation of the inserted modules in accordance with the program set forth in the flow chart of FIG. 6, discussed in more detail below.

When the new module is fully inserted (FIG. 4A), the Global Monitor Signal again goes high (finger 42 no longer shorts it to ground) and the 60 v. signal is again connected to the voltage regulator circuits 27 of the newly inserted module to activate the new module. The control processor then places the newly inserted module in its required state so that the group of modules is restored to a fully operative configuration as if the failure of the replaced module had not taken place.

Figure 5:
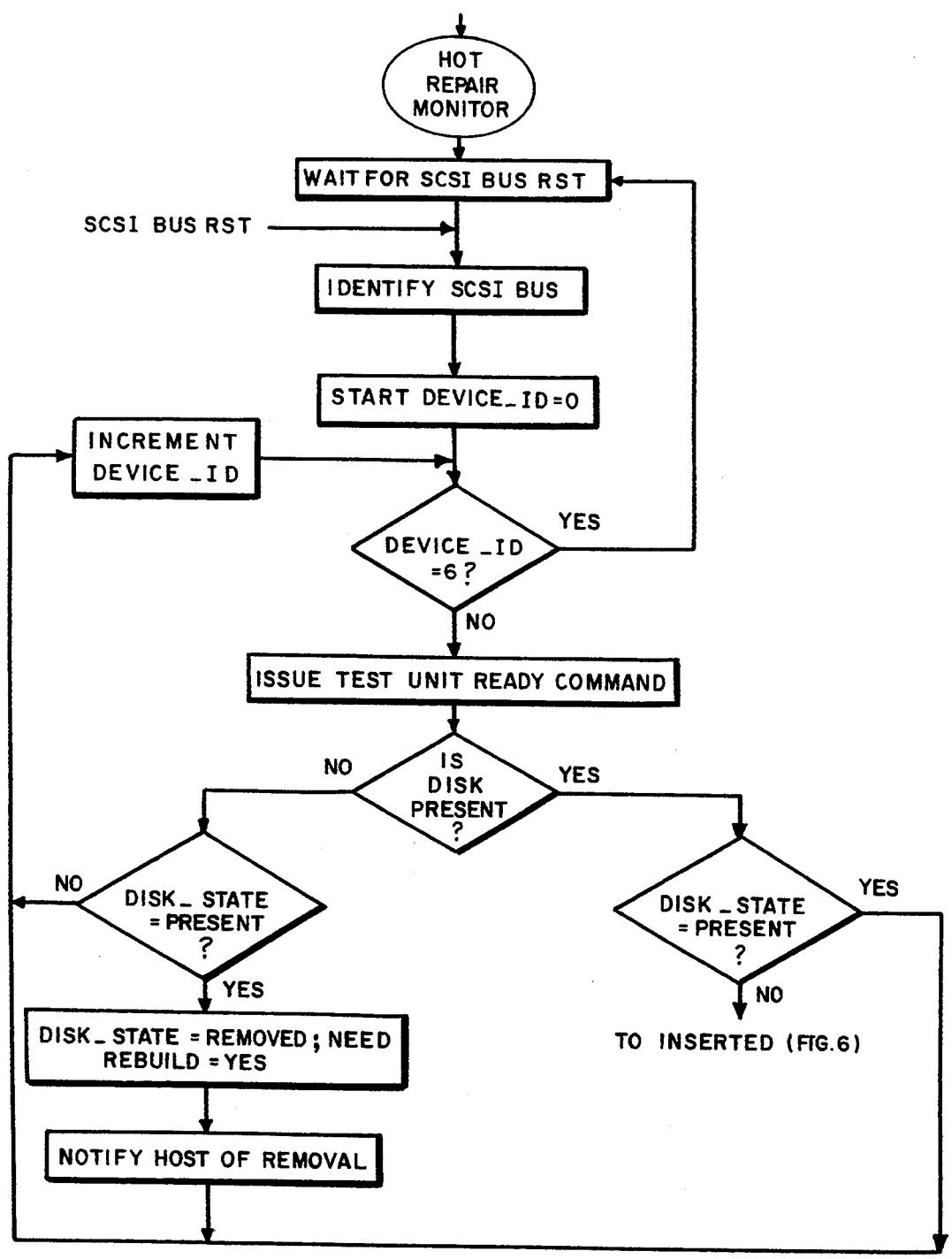
FIG. 5 shows a flow chart diagram depicting a routine performed by a control processor of the invention in a module removal operation.

FIG. 5 depicts a flow chart of the operation performed by the control process when a module is removed. As mentioned above, the control processor takes no action until a reset (RST) signal is generated by a module and is supplied to the control processor via the SCSI bus. When a SCSI bus RST signal occurs, the control processor identifies which SCSI bus has supplied the RST signal. The control processor then polls each of the six module devices on the identified SCSI bus to determine the action that occurred (i.e., a removal or an insertion).

In accordance therewith, beginning with the first device (Device ID=0) the control processor issues a test unit ready command for the device in question and determines if a disk is present on that module. If it is, the processor increments to the next device and performs the same operation thereon. If no disk is present, the processor must then determine whether the processor's previously determined information on that device shows that the disk should be present, that is, whether there has been a change in the status of the disk at that device slot. If such determination shows no disk is present but that a disk should be present, the processor identifies the slot involved and notes that the disk at that slot has been removed and that the slot must be filled with a new disk module and the state of the disk updated, i.e., the data on the disk must be rebuilt, i.e., reconstructed. The host computer is also notified that a disk that had previously been present has been removed. The next device is then examined.

If, however, the processor determines that no change in status has occurred, i.e., there is no disk present at that slot and that there was no disk present at that slot before the current test was made, the next device is then examined.

If, after the issuance of a test unit ready command, the processor determines both that a disk is present and that such disk should have been present (i.e., the processor has previously determined that a disk is present), no change has occurred and the next device is examined. If the processor determines that a disk is now present but that the disk should not have been present (i.e., the processor has previously determined that a disk is not present), then a insertion action has occurred. The processor then must respond to the insertion operation as shown in FIG. 6.

Figure 6:
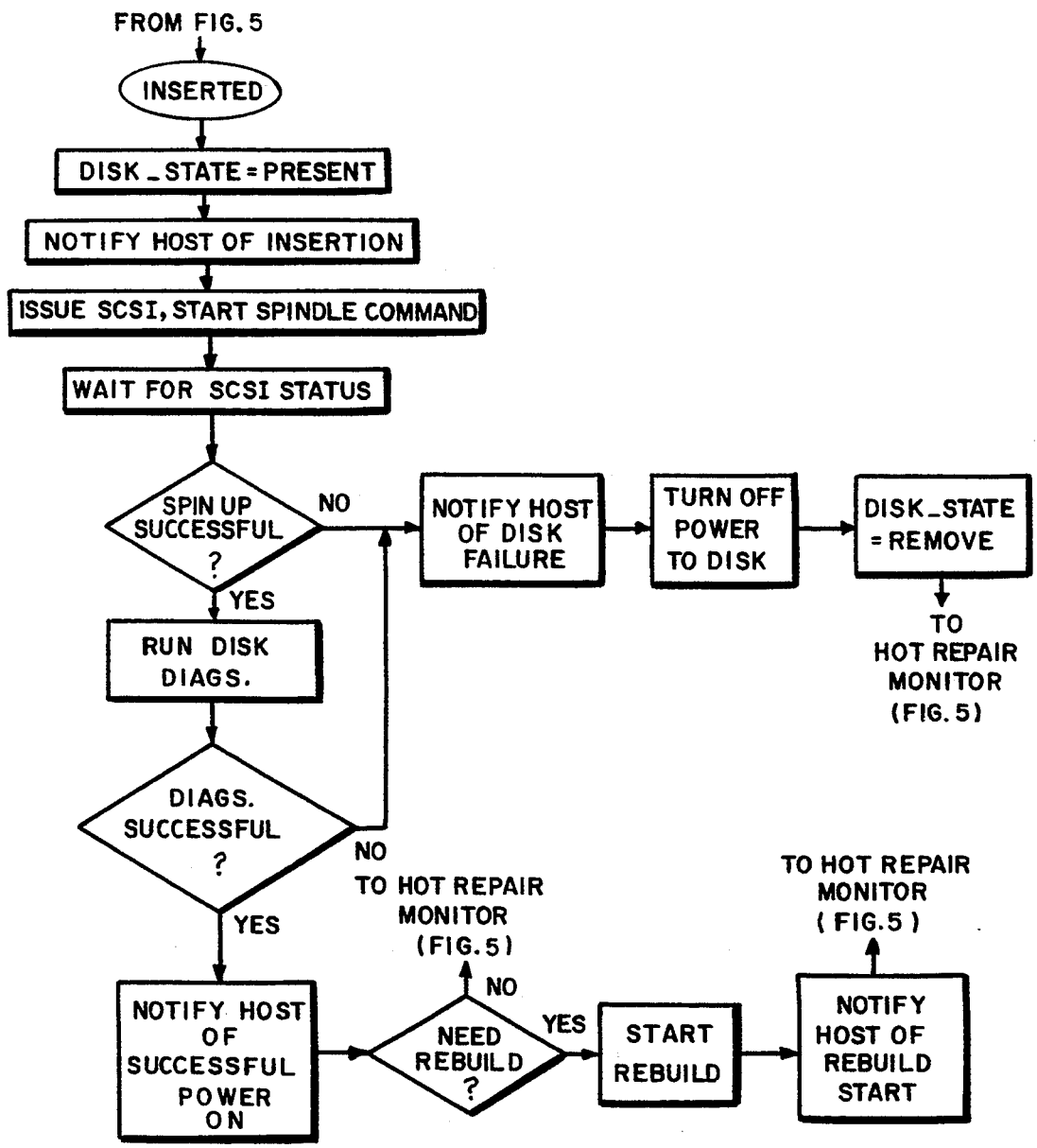
FIG. 6 shows a flow chart diagram depicting a routine performed by a control processor of the invention in a module insertion operation.

As seen in FIG. 6, when a determination is made that a disk is present (when it previously was not), the host computer is notified that an insertion has occurred. The control processor issues a SCSI START SPINDLE command to rotate the disk. The processor waits for the SCSI bus to become available and, when the SCSI bus is available, it determines whether the spin up of the spindle was or was not successful. If spin up has successfully occurred, the normal disk diagnostic routines are performed and, if such routines indicate that the disk is operating as required, the host computer is notified.

Since at that time a new disk is operable, a determination is made as to whether the information stored on the disk must be rebuilt. If no rebuilding is required, the processor can return to its pending or wait status of its hot repair monitor program to await the next removal-/insertion action with respect to a module.

If the data on the disk needs to be reconstructed, the host computer supplies the information needed to rebuild the newly inserted disk to the state the old disk would have been in if it had not failed and had not had to be replaced. Such rebuilding operations are well known to the art for multiple disk storage arrays and need not be discussed in detail here. Once the disk data is reconstructed, the operation of the module group can continue and the hot repair monitor program can be placed in a wait, or pending, status to await the next removal/insertion action with respect to a module of the array.

If, on the other hand, the disk itself is defective and a successful spin up does not occur, the host is notified that the disk has failed. The control processor then turns off power to that disk and the disk can be removed. The routine then returns to the hot repair monitor operation and is placed in a wait status in accordance therewith.

Specific implementations of the routines, represented by the flow charts of FIGS. 5 and 6, in the control processor would be well within the skill of the art from what is disclosed therein and need not be described in further detail here.

In summary, when a module of an array becomes defective, it can be removed while other modules of the array can continue to operate. The control processor handles the removal by being notified that a physical action has occurred, the processor then polling the modules of an identified group thereof to identify the module of that group which has been physically acted upon. A determination is made as to whether the action is a removal action or an insertion action. If a removal is indicated, the host is also notified of the removal.

When the program indicates that a new module has been inserted, the disk associated with the module is tested to see if successful spin up thereof occurs and, if so, the data on the disk can be reconstructed as necessary and a rebuild operation is performed. Once a data reconstruction occurs, the removal/insertion operation is complete and the array continues its operation with the new updated module and the control processor awaits the next physical action.

If the disk spin up is not successful (i.e., the disk is defective) power to that module is turned off so that the module can be removed and replaced by a new module in the same manner.

While the above hot repair technique represents a preferred embodiment thereof as described with respect to a particular module array depicted, modifications thereof may occur to those in the art within the spirit and scope of the invention. Hence, invention is not to be construed as limited to the specific embodiment described above except as defined by the appended claims.

What is claimed is:

1. A method for providing on-line replacement of at least one module, which is at a specified position in an array of modules connected to a common control processor, with a replacement module so that the non-replaced modules in said array continue to provide data transfer operations during said replacement, said method comprising the steps of
   (a) removing said at least one module from its position in the array;
   (b) indicating to said control processor that said removal has occurred and identifying the position in the array of the module which has been removed.
   (c) repeating any data transfer operation which may have occurred during said removing step;
   (d) inserting a replacement module at the position in the array of said removed module;
   (e) indicating to said control processor that a replacement module has been inserted at the position of said removed module;
   (f) testing the operation of said replacement module; and
   (g) updating the state of said replacement module so as to place it in the same state the removed module would have been in if it had not been removed.

2. A method for providing on-line replacement of at least one module, which is at a specified position in an array of modules connected to a common control processor, with a replacement module so that the non-replaced modules in said array continue to operate during said replacement, said method comprising the steps of
   (a) removing said at least one module from its position in the array;
   (b) indicating to said control processor that said removal has occurred and identifying the position in the array of the module which has been removed.
   (c) inserting a replacement module at the position in the array of said removed module;
   (d) indicating to said control processor that a replacement module has been inserted at the position of said removed module;
   (e) testing the operation of said replacement module; and
   (f) updating the state of said replacement module so as to place it in the same state the removed module would have been in if it had not been removed
   wherein step (b) includes
     (i) providing a plurality of global monitor signals, each having a particular state, to selected groups of said modules in said array;
     (ii) indicating to said control processor a change of state in the global monitoring signal of a group which contains said removed module to indicate said module has been removed; and
     (iii) identifying the position of said removed module in said group.

3. A method in accordance with claim 2 wherein in step (ii) each of the modules of the group containing said removed module responds to the change in state of said global monitor signal to provide a reset signal to said control processor to indicate to said processor that a removal has occurred.

4. A method in accordance with claim 3 wherein in step (iii) said control processor
   identifies the group of modules from which said reset signal has been received; and
   polls the modules of said group to determine that a removal has occurred and to identify the position of the module therein that has been removed.

5. A method in accordance with claim 2, wherein step (ii) includes
   (ii)' removing power from said removed module prior to indicating to said control processor the change of state in said global monitoring signal.

* * * * *